US012562095B2

(12) United States Patent
Jeong et al.

(10) Patent No.: US 12,562,095 B2
(45) Date of Patent: Feb. 24, 2026

(54) DISPLAY DEVICE

(71) Applicant: LG Display Co., Ltd., Seoul (KR)

(72) Inventors: Yang Seok Jeong, Paju-si (KR); Jin Min Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/975,423

(22) Filed: Dec. 10, 2024

(65) Prior Publication Data

US 2025/0273119 A1     Aug. 28, 2025

(30) Foreign Application Priority Data

Feb. 28, 2024     (KR) ........................ 10-2024-0029130

(51) Int. Cl.
| | |
|---|---|
| *G09G 3/20* | (2006.01) |
| *G06F 3/01* | (2006.01) |
| *G09G 3/3258* | (2016.01) |
| *G09G 3/3291* | (2016.01) |

(52) U.S. Cl.
CPC ........... *G09G 3/2092* (2013.01); *G06F 3/013* (2013.01); *G09G 3/3291* (2013.01); *G09G 3/3258* (2013.01); *G09G 2300/0842* (2013.01);

*G09G 2300/0861* (2013.01); *G09G 2320/068* (2013.01); *G09G 2330/023* (2013.01); *G09G 2354/00* (2013.01); *G09G 2380/10* (2013.01)

(58) Field of Classification Search
None
See application file for complete search history.

(56) References Cited

U.S. PATENT DOCUMENTS

| | | | |
|---|---|---|---|
| 2017/0278475 A1* | 9/2017 | Im | ........................ G09G 3/3677 |
| 2025/0044856 A1* | 2/2025 | Ma | ........................ G06F 1/3218 |

FOREIGN PATENT DOCUMENTS

| | | |
|---|---|---|
| KR | 101470636 B1 | 12/2014 |
| KR | 101610147 B1 | 4/2016 |
| KR | 20230101488 A | 7/2023 |

* cited by examiner

*Primary Examiner* — Ifedayo B Iluyomade
(74) *Attorney, Agent, or Firm* — Seed Intellectual Property Law Group LLP

(57) ABSTRACT

An embodiment includes a display panel configured to display an image; a data driving circuit configured to apply a data voltage to the display panel; and a timing controller configured to control the data driving circuit. The timing controller transmits black data to the data driving circuit for a first period in a power saving mode, the data driving circuit stores the black data and repeatedly outputs a black voltage according to the stored black data for a first frame period.

24 Claims, 10 Drawing Sheets

DISPLAY DEVICE

CROSS-REFERENCE TO RELATED APPLICATION

This application claims priority to and the benefit of Korean Patent Application No. 10-2024-0029130, filed Feb. 28, 2024, the disclosure of which is incorporated herein by reference in its entirety.

BACKGROUND

Technical Field

Embodiments relate to a display device.

Description of the Related Art

As the market for future vehicles such as electric vehicles and autonomous vehicles expands, the demand for vehicle display devices is increasing rapidly. The importance of reducing display power consumption is increasing due to the commercialization of electric vehicles, and the enlargement and high resolution of vehicle displays.

BRIEF SUMMARY

An embodiment provides a display device that reduces power consumption.

An embodiment provides a display device capable of varying a viewing angle.

An embodiment provides a display device having different power consumption reduction methods for each display area.

The technical features and characteristics of the present disclosure is not limited to those mentioned above, and other technical features and characteristics not mentioned will be clearly understood by those skilled in the art from the following description.

A display device according to one embodiment of the present disclosure includes a display panel configured to display an image; a data driving circuit configured to apply a data voltage to the display panel; and a timing controller configured to control the data driving circuit, wherein the timing controller transmits black data to the data driving circuit during a first period in a power saving mode, and the data driving circuit stores the black data and repeatedly outputs a black voltage according to the stored black data during a first frame period.

The first period may be a data transmission period of a first pixel line of the first frame.

The timing controller may not transmit image data within the first frame period after the first period.

The timing controller may transmit a control signal and a clock training signal for each pixel line cycle during the first frame period.

The control signal contains a mode change signal, and when the mode change signal is received, the data driving circuit may output a black voltage according to the stored black data without outputting the transmitted data.

The timing controller may not transmit a clock training signal, a control signal, and image data for a predetermined frame period after the first frame period.

The display panel may output a black image for the predetermined frame period.

The timing controller may output black data to the first pixel line in the next frame period after the predetermined frame period.

The power saving mode may be triggered if it is determined that the user does not gaze at the display panel.

A gate driving circuit according to one embodiment of the present disclosure includes a data logic part; a first latch configured to store data supplied from the data logic part; a second latch configured to store data stored in the first latch; a switch part disposed between the first latch and the second latch; and a digital-to-analog converter configured to convert a digital signal output from the second latch into an analog voltage, wherein the first latch and the second latch may store black data input during a first period, and the data logic part may repeatedly output the black voltage during the first frame period by applying a source output signal to the second latch while the switch part is turned off after the first period.

A device according to one embodiment of the present disclosure includes a display device including a first display area configured to display a first image and a second display area configured to display a second image; an image acquisition device configured to track the user's gaze staring at the display device; and a host system configured to control the display device and the image acquisition device, wherein the host system may output a control signal to the display device to operate the second display area in a power saving mode if it is determined that the second image is not being viewed, the display device may include a display panel configured to display an image; a data driving circuit configured to apply a data voltage to the display panel; and a timing controller configured to control the data driving circuit, the timing controller may transmit black data to the data driving circuit during a first period in a power saving mode, and the data driving circuit may store the black data and repeatedly output a black voltage according to the stored black data during the first frame period.

The display device according to an embodiment has reduced power consumption, allowing low power driving.

The display device according to an embodiment may be operated independently for each display area to reduce power consumption while maintaining driving safety.

The technical effects of the present disclosure are not limited to the above-mentioned technical effects, and other effects not mentioned may be clearly understood by those skilled in the art from the description including the claims.

BRIEF DESCRIPTION OF THE SEVERAL VIEWS OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
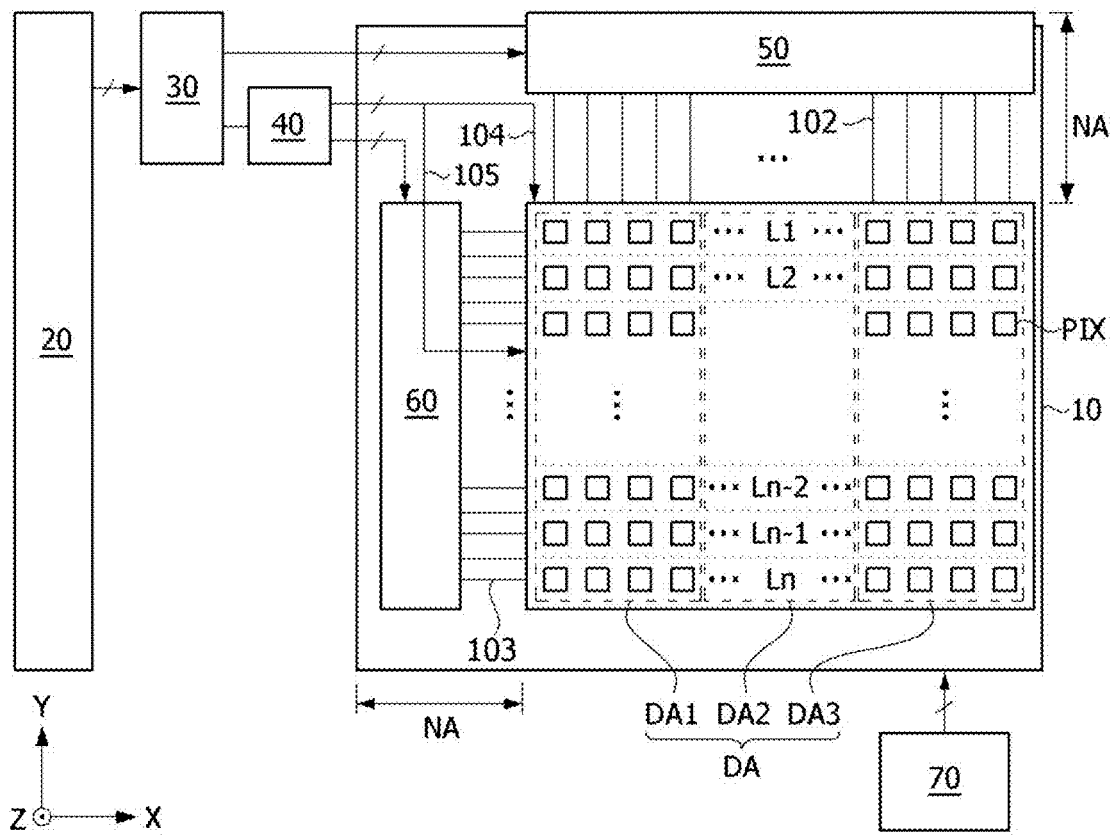
FIG. 1 is a schematic block diagram illustrating a display device according to one embodiment of the present disclosure.

The characteristics and features of the present disclosure, and methods of achieving them will be apparent from the embodiments described in detail below in conjunction with the accompanying drawings. However, the present disclosure is not limited to the following embodiments, which may be implemented in various different forms; rather, the present embodiments are provided to make the disclosure of the present disclosure complete and to allow those skilled in the art to fully understand the scope of the present disclosure.

The shapes, sizes, proportions, angles, numbers and the like shown in the accompanying drawings for the purpose of describing the embodiments of the present disclosure are merely examples, and the present disclosure is not limited thereto. Like reference numerals generally denote like elements throughout the present specification. Further, in describing the present disclosure, detailed descriptions of known related technologies may be omitted so as not to unnecessarily obscure the subject matter of the present disclosure.

The terms such as "comprising," "including," "having," and "consisting of" used herein are generally intended to allow other components to be added unless the terms are used with the term "only." References to the singular shall be construed to include the plural unless expressly stated otherwise.

In interpreting components, they are construed to include a margin of error, even if it is not explicitly stated.

When describing a positional or interconnected relationship between two components, such as "on top of," "above," "below," "next to," "connect or couple with," "crossing," "intersecting," etc., one or more other components may be interposed between them unless "immediately" or "directly" is used.

When describing a temporal contextual relationship is described, such as "after," "following," "next to," or "before," it may not be continuous on a time scale unless "immediately" or "directly" is used.

The first, second, and so on may be used to distinguish the components, but the functions or structures of these components are not limited to the ordinal number or component name attached to the component.

The following embodiments may be combined or associated with each other in whole or in part, and various types of interlocking and driving are technically possible. The embodiments may be implemented independently of each other or together in an interrelated relationship.

Hereinafter, various embodiments of the present disclosure will be described in detail with reference to the accompanying drawings.

FIG. 1 is a block diagram illustrating a display device according to one embodiment of the present disclosure.

Referring to FIG. 1, a display device according to one embodiment of the present disclosure may include a display panel 10, and a display panel driving circuit for writing pixel data to pixels of the display panel 10. The display device may include a power supply 70.

The display panel 10 may be, but is not limited to, a rectangular shaped panel having a length in the X-axis direction (or first direction), a width in the Y-axis direction (or second direction), and a thickness in the Z-axis direction (or third direction). For example, the display panel 10 may be a deformed panel that is at least partially curved or elliptical. It may also consist of multiple physically separated sub-panels.

A display area DA of the display panel 10 includes a pixel array for displaying an input image thereon. The pixel array includes a plurality of data lines 102, a plurality of gate lines 103 intersected with the data lines 102, and the pixels arranged in a matrix form. The display panel 10 may further include power lines commonly connected to the pixels. The power lines may be commonly connected to pixel circuits and supply a voltage for driving the pixels PIX to the pixels PIX.

Each of the pixels may be divided into a red sub-pixel (hereinafter referred to as a first sub-pixel), a green sub-pixel (hereinafter referred to as second sub-pixel), and a blue sub-pixel (hereinafter referred to as a third sub-pixel) for color implementation. Each of the pixels may further include a white sub-pixel. Each sub-pixel includes a pixel circuit for driving a light-emitting element. The light-emitting element may be implemented as, but is not limited to, an organic light-emitting element, such as an OLED, or an inorganic light-emitting element, such as a micro light-emitting diode (LED). Each of the pixel circuits may be connected to the data line, the gate lines, and the power lines. In the following, a pixel may be interpreted as a sub-pixel.

Each of the pixels may include a first light-emitting element that emits in a first viewing angle mode (hereinafter referred to as "first mode") and a second light-emitting element that emits in a second viewing angle mode (hereinafter referred to as "second mode"). Each of the pixels PIX may emit light from the first light-emitting element in a wide viewing angle in the first mode, while emitting light from the second light-emitting element in a narrow viewing angle in the second mode.

The display area DA may be divided into a first display area to a third display area DA1, DA2, and DA3, each of which may be operated independently. In other words, different images may be output in the first to third display areas DA1, DA2, and DA3.

The display array DA includes a plurality of pixel lines L1 to Ln. Each of the pixel lines L1 to Ln includes one pixel line arranged along the line direction (Z-axis direction) in the pixel array of the display panel 10. The pixels disposed on one pixel line in the first display area to third display area DA1, DA2, and DA3 may share the gate lines 103. The sub-pixels arranged in the column direction (Y) may share the same data line 102. One horizontal period is a time obtained by dividing one frame period by the total number of the pixel lines L1 to Ln.

The display panel 10 may be implemented as a non-transmissive display panel or a transmissive display panel. The transmissive display panel may be applied to a transparent display device in which an image is displayed on a screen and a real object is visible beyond the display panel. The display panel 10 may be made as a flexible display panel that may be flexibly bent.

The power supply 70 receives an input voltage applied from a host system 20 and outputs voltages to drive the pixels PIX of the display panel 10 and the display panel driving circuit. To this end, the power supply 70 may include a direct current to direct current converter (DC-DC converter). The DC-DC converter may include a charge pump, a regulator, a buck converter, a boost converter, and the like. The power supply 70 may output constant voltages (or direct current voltages), such as a gate-high voltage, a gate-low voltage, a pixel driving voltage, a cathode voltage, a reference voltage, an initialization voltage, and an IC driving voltage for the display panel drive circuit through the DC-DC converter. The gate-high voltage and the gate-low voltage may be supplied to a level shifter 40 and a gate driver 60. The constant voltages such as the pixel driving voltage, the cathode voltage, the reference voltage, and the initialization voltage are supplied to the pixels PIX via the power lines commonly connected to the pixels PIX.

The power supply 70 may further include a gamma voltage generator. The gamma voltage generator may receive a high potential reference voltage and a low potential reference voltage and output a plurality of gamma reference voltages divided by a predetermined voltage difference interval on a preset gamma curve, for example, 2.2 gamma curve. The gamma reference voltages may be supplied to the data driving circuit 50. In the data driver 50, the gamma reference voltages are divided by a voltage divider circuit and subdivided into grayscale voltages. The gamma voltage generator may be implemented as a programmable gamma circuit capable of adjusting each of the gamma reference voltages according to digital data. A timing controller 30 or the host system 20 or a separate external device may update digital data to be stored in a register of the programmable gamma circuit through a communication interface.

The display panel driving circuit writes the pixel data of the input image to the pixels PIX of the display panel 10 under the control of the timing controller 30. The display panel driving circuit includes a data driving circuit 50, a gate driver 60, a level shifter 40, and the timing controller 30.

The display panel driving circuit may further include a touch sensor driver for driving touch sensors. The touch sensor driver is omitted from FIG. 1. The data driving circuit 50 and the touch sensor driver may be integrated into a source drive integrated circuit (IC).

The data driving circuit 50 receives the pixel data of the input image received as a digital signal from the timing controller 30 and outputs the data voltage. The data driving circuit 50 may receive the gamma reference voltages and generate a gamma compensation voltage for each grayscale through a voltage division circuit. The gamma compensation voltage for each grayscale may be supplied to a digital-to-analog converter circuit (hereinafter referred to as "DAC") disposed on each of the channels of the data driver 50.

The data driving circuit 50 samples and latches the digital data received from the timing controller 30, and then inputs the digital data to the DAC. Here, the digital data includes pixel data of the input image. The DAC converts the pixel data to the gamma compensation voltage and outputs the data voltage of the pixel data.

The gate driver 60 may be formed on the display panel 10 together with circuit elements of the display area DA and the wires. The gate driver 60 may be disposed in the non-display area NA on at least one of the right or left sides outside the display area DA in the display panel 10, or at least a portion thereof may be disposed within the display area DA.

The gate driver 60 may be disposed in the non-display areas NA on both sides of the display panel 10 with the display area DA of the display panel interposed therebetween, and may supply gate pulses from both sides of the gate lines 103 in a double feeding method. In another embodiment, the gate driver 60 may be disposed in at least one of the left and right non-display areas NA of the display panel 10 and may supply gate signals to the gate lines 103 in a single feeding method. The gate driver 60 sequentially outputs pulses of the gate signals to the gate lines 103 under the control of the timing controller 30. The gate driver 60 may shift the pulses of the gate signals using a shift register or an edge trigger to sequentially supply these signals to the gate lines 103.

The gate signals may include a scan signal input to the pixel circuit through a plurality of gate lines, and an emission signal (hereinafter referred to as an "EM signal"). In this case, the gate driver may include a gate driving part that outputs the scan signal and a gate driving part that outputs the EM signal. Each of the scan signal and the EM signal may swing between the gate high and gate low voltages.

The timing controller 30 receives digital video data of the input image and a timing signal synchronized with the digital video data from the host system 20. The timing signal may include a vertical synchronization signal Vsync, a horizontal synchronization signal Hsync, and a data enable signal DE. A vertical period and a horizontal period may be known by a method of counting the data enable signal DE, and thus the vertical synchronization signal Vsync and the horizontal synchronization signal Hsync may be omitted. The horizontal synchronization signal Hsync and the data enable signal DE have a period of one horizontal period (1H).

The timing controller 30 generates a data timing control signal for controlling the operation timing of the data driving circuit 50 and a gate timing control signal for controlling the operation timing of the gate driver 60 based on the timing signals Vsync, Hsync, and DE received from the host system 20, thereby controlling the display panel driving circuit. The timing controller 30 may synchronize the data driving circuit 50 and the gate driver 60 by controlling the operation timing of the display panel driving circuit.

The gate timing control signal output from the timing controller 30 may be input to the shift register of the gate driver 60 through the level shifter 40. A mode selection signal output from the timing controller 30 may be input to a mode selection circuit through the level shifter 40. The mode selection signal may contain a vertical mode selection signal and a horizontal mode selection signal.

The level shifter 40 may convert a voltage level of the signal received from the timing controller 30 to a swing width between the gate-high voltage and the gate-low voltage and output the same. The level shifter 40 may decode the gate timing signal to output a start pulse and clock to drive the gate driver 60, and may decode the mode selection signal to output the vertical mode selection signal and the horizontal mode selection signal. The start pulse, clock, vertical mode select signal, and horizontal mode select signal are each alternating current signals that swing between the gate-high voltage and the gate-low voltage.

The host system 20 may scale an image signal from a video source to match the resolution of the display panel 10, and may transmit it to the timing controller 30 together with the timing control signal. The host system 20 may transmit a viewing angle mode signal having different logic values in the first mode and the second mode together with the image signal to the timing controller 30 at least once every frame. The timing controller 30 may output the vertical mode selection signal and the horizontal mode selection signal in response to the viewing angle mode signal.

Figure 2:
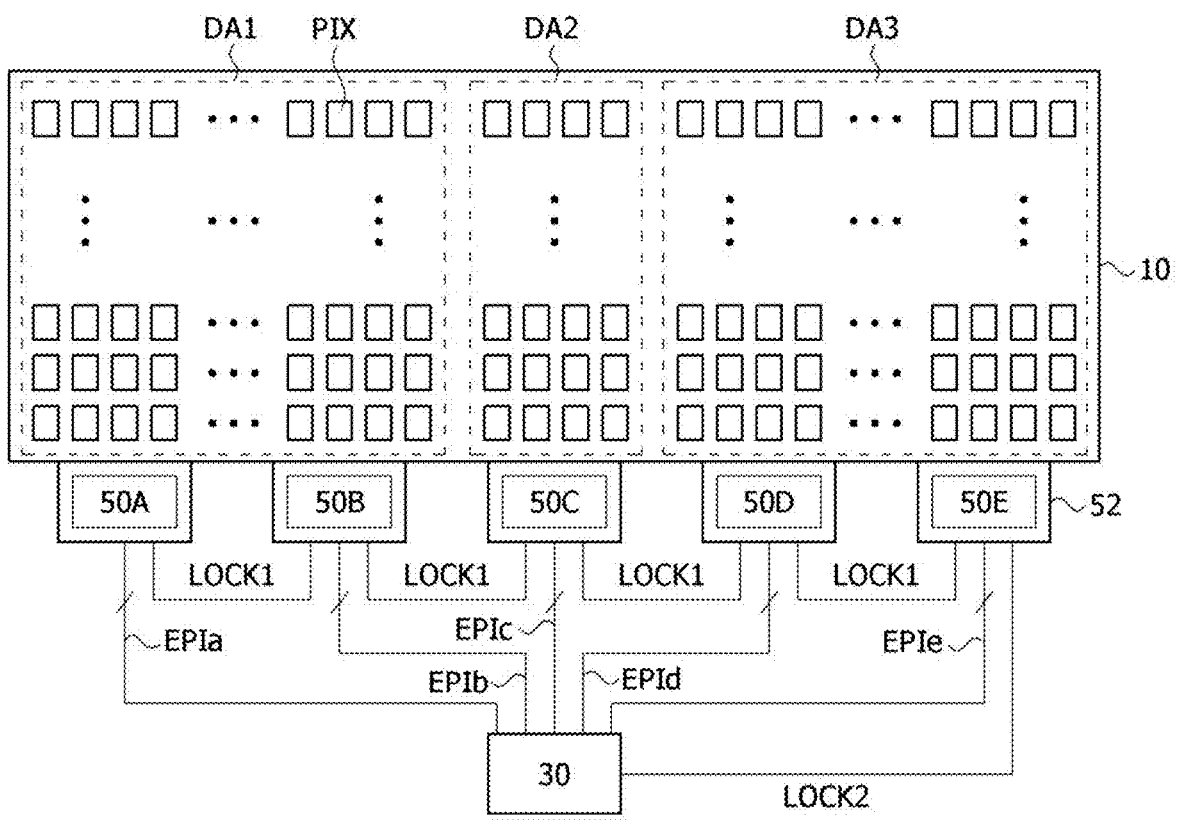
FIG. 2 is a block diagram illustrating a display device according to one embodiment of the present disclosure.

Referring to FIG. 2, the display device may include a display panel 150, a plurality of data driving circuits 50A, 50B, 50C, 50D, and 50E, and a timing controller 30. A plurality of data driving circuits 50A, 50B, 50C, 50D, and 50E may be mounted on a plurality of flexible substrates 52, respectively.

A plurality of data driving circuits 50A, 50B, 50C, 50D, and 50E may each have communication interfaces EPIa to EPIe, and may be supplied with signals including a clock signal, a data signal output, and the like output from the timing controller 30 in the form of a data packet based on the communication interfaces EPIa to EPIe. Hereinafter, the communication interfaces EPIa to EPIe are illustrated and described as an example of an EPI interface (Embedded Clock Point-Point Interface) based on an embedded clock method.

A plurality of data driving circuits 50A, 50B, 50C, 50D, and 50E may include a first lock signal terminal LOCK1 and a second lock signal terminal LOCK2 to exchange lock signals for indicating their state. For example, the first data driving circuit 50A may receive a signal from the outside through the first lock signal terminal LOCK1, generate a lock signal to indicate its own state together with a signal generated inside, and output the generated lock signal through the second lock signal terminal LOCK2.

The second data driving circuit 50B may receive the lock signal output from the first data driving circuit 50A through the first lock signal terminal LOCK1, generate a lock signal to indicate its own state together with an internally generated signal, and output the generated lock signal through the second lock signal terminal LOCK2.

In this way, the lock signal of the second data driving circuit 50B may be transmitted to the third data driving circuit 50C, the lock signal of the third data driving circuit 50C may be transmitted to the fourth data driving circuit 50D, and the lock signal of the fourth data driving circuit 50D may be transmitted to the fifth data driving circuit 50E.

The fifth data driving circuit 50E positioned at the last of a plurality of data driving circuits 50A, 50B, 50C, 50D, and 50E may apply the lock signal output through the second lock signal terminal LOCK2 to the timing controller 30.

The timing controller 30 may determine the status of the plurality of data driving circuits 50A, 50B, 50C, 50D, and 50E based on the lock signal applied from the fifth data driving circuit 50E, and output a data signal or the like through the communication interfaces EPIa to EPIe coupled with the plurality of data driving circuits 50A, 50B, 50C, 50D, and 50E when the state corresponds to a normal state.

According to an embodiment, the timing controller 30 may transmit different EPI data for each display area through communication interfaces EPIa to EPIe coupled with a plurality of data driving circuits 50A, 50B, 50C, 50D, and 50E.

For example, since the first display area DA1 outputs important information related to driving, it may not operate in the power saving mode and may always output all image information while driving. However, since the second display area DA2 and the third display area DA3 output information that is not directly related to driving or that helps driving, they may operate in the power saving mode in some implementations. During the power saving mode operation, some of the EPI data transmitted to each data driving circuit may be omitted.

Since the first display area DA1 and the second display area DA2 output information related to driving, whereas the third display area DA3 outputs information not related to driving, the third display area may operate in the power saving mode in some implementations. The driving-related information may be a concept including information for driving of the vehicle, such as vehicle speed information, fuel information, navigation, and the like, and the information not related to driving of the vehicle may be a concept including information not necessary for driving of the vehicle, such as movies, games, YouTube, the Internet, and the like.

However, embodiments of the present disclosure are not limited thereto. For example, in the first display area, remaining information except for some information for driving may also be omitted in the power saving mode.

A plurality of data driving circuits may be disposed in each of the first to third display areas DA1 to DA3. Therefore, when the third display area DA3 is operated in the power saving mode, the timing controller 30 may operate the fourth and fifth data driving circuits 50D and 50E controlling the third display area DA3 in the power saving mode. In this case, the timing controller 30 may operate the first and second data driving circuits 50A and 50B controlling the first display area DA1 in the normal mode as it is. The normal mode may be a mode in which the corresponding display area transmits the image information to be output as it is, and the power saving mode may be a mode in which the corresponding display area omits some of the image information to be output and transmits it.

Sizes of the first to third display areas DA1 to DA3 are not particularly limited. For example, the sizes of the second and third display areas DA2 and DA3 may be larger than those of the first display area DA1.

Figure 3:
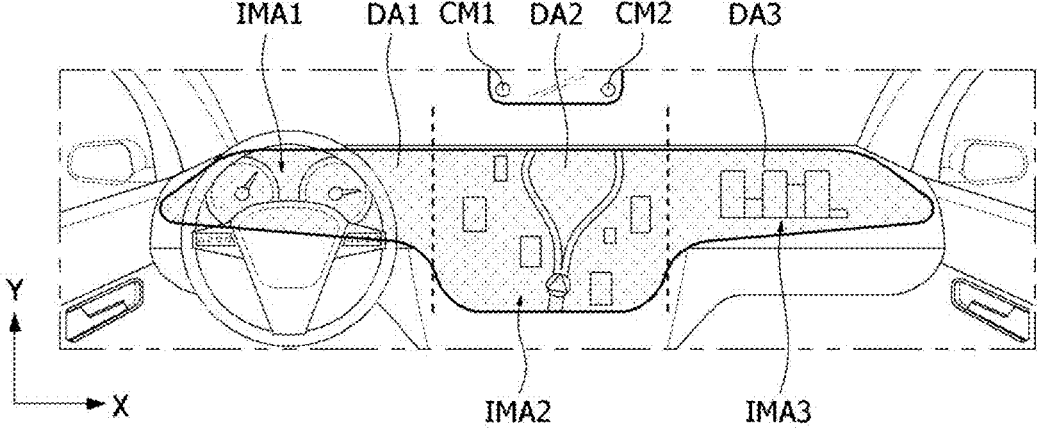
FIG. 3 is a diagram illustrating a state in which a display device according to one embodiment of the present disclosure is applied to a vehicle.

Referring to FIG. 3, the display device may be a display for a vehicle disposed in front of the vehicle. However, embodiments of the present disclosure are not limited thereto. The display device may include a first display area DA1 disposed in front of the driver to output an image IMA1 related to safety of the vehicle like the speed of the vehicle, and a second display area DA2 and a third display area DA3 disposed in front of a passenger seat to output images IMA2 and IMA3 that may be viewed by the driver and the passenger together. The viewing angle of the second display area DA2 and the third display area DA3 may be adjusted so as not to interfere with driving while driving.

When the navigation image IMA2 is output to the second display area DA2, the second display area DA2 may be operated in a wide viewing angle mode so that the driver can view the navigation image. However, when the driver and the passenger do not view the navigation, the second display area DA2 may be operated in a power saving mode. Therefore, an image may not be output in real time or some information may be omitted, thereby reducing power consumption.

The passenger may enjoy various content images through the third display area DA3 even while driving. For example, a content image that is not related to the driving of the vehicle, such as a movie or news, may be output on the third display area DA3. Since an image displayed on the third display area DA3 may distract the driver's attention while driving, a narrow viewing angle mode is operated so that the driver cannot see it. Also, if the passenger does not gaze at the third display area DA3, the third display area DA3 may output a black image to reduce power consumption.

However, embodiments of the present disclosure are not limited thereto. The display device may be applied to various devices other than the vehicle. For example, the display device may be applied to various electronic devices that need to operate the display device in a power saving mode when the user does not gaze at the display device, such as a monitor with a built-in camera.

Figure 4:
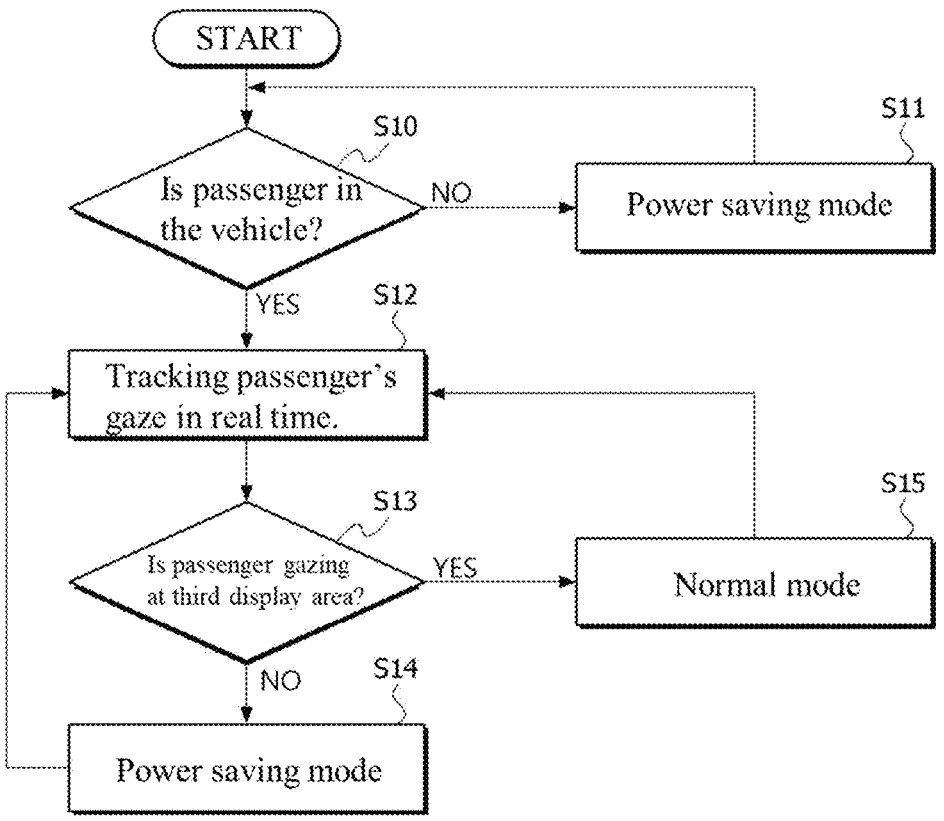
FIG. 4 is a flowchart illustrating a process of driving a third display area according to one embodiment of the present disclosure.
Figure 5:
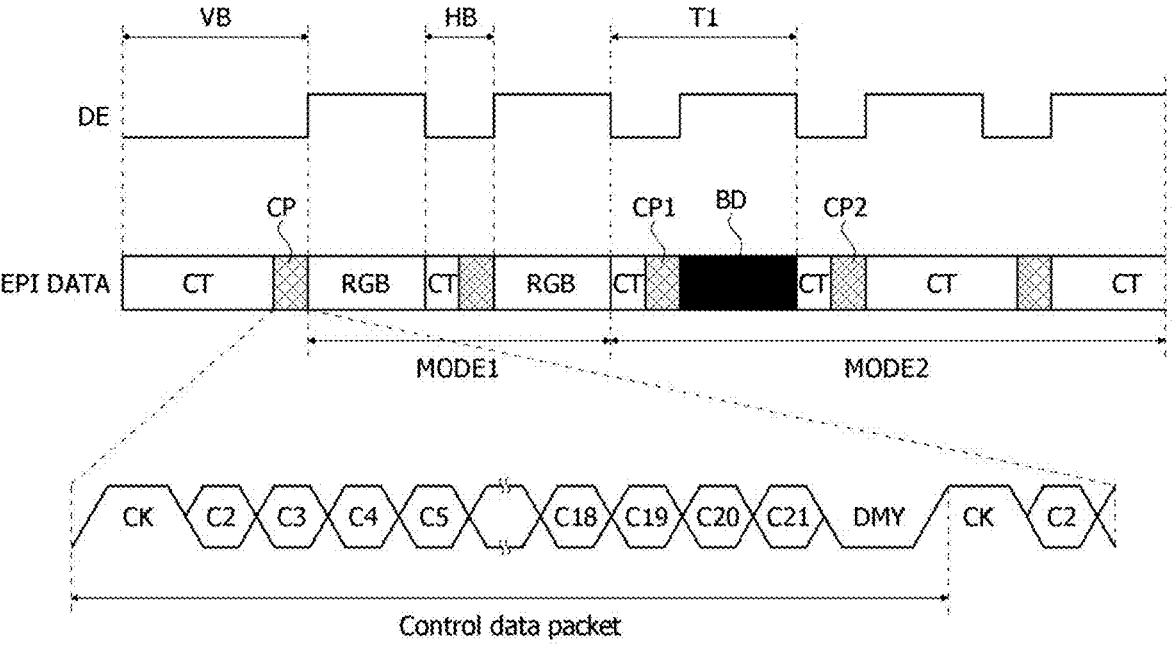
FIG. 5 is a diagram illustrating a data sequence according to one embodiment of the present disclosure.
Figure 6:
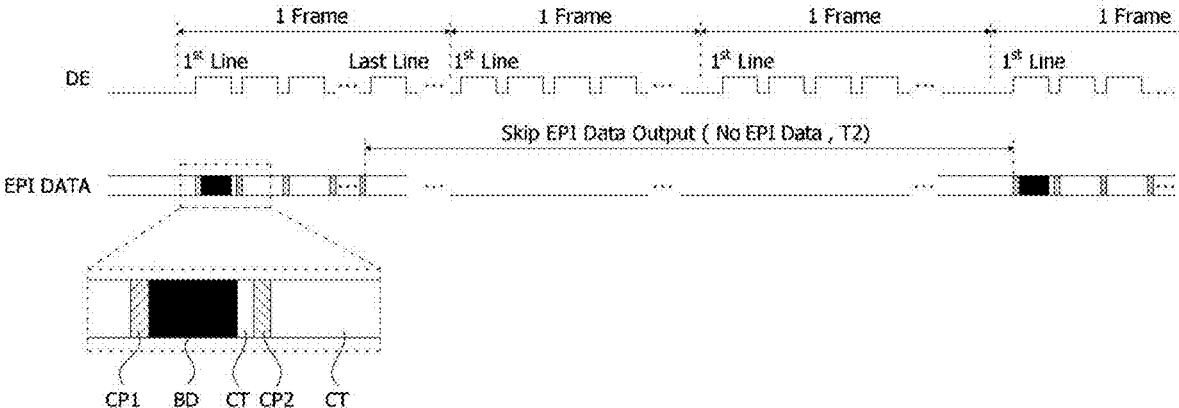
FIG. 6 is a diagram illustrating a state in which data transmission is skipped in a power saving mode according to one embodiment of the present disclosure.

FIG. 4 is a flowchart illustrating a process of driving a third display area according to one embodiment of the present disclosure. FIG. 5 is a diagram illustrating a data sequence according to one embodiment of the present disclosure. FIG. 6 is a diagram illustrating a state in which data transmission is skipped in a power saving mode according to one embodiment of the present disclosure.

Referring to FIGS. 3 and 4, when the ignition switch of the vehicle is turned on and the vehicle operates in a driving mode, the image analysis part of the host system 20 of the vehicle outputs a control signal so that an image acquisition device such as cameras CM1 and CM2 photographs the user's face, and analyzes the images acquired by the cameras CM1 and CM2 to track the gaze of the user and/or passenger in real time. Various image detection algorithms may be applied to a technology for tracking the gaze of a user and/or a passenger using a camera image. Accordingly, the host system 20 of the vehicle may detect which of the first to third display areas DA1, DA2, and DA3 the user is looking at.

The camera may simultaneously detect the gaze of the user and the gaze of the passenger, and a plurality of cameras may detect the gaze of the user and the gaze of the passenger, respectively. The passenger may be a person sitting in the passenger seat next to the driver's seat. The user may be a concept including the driver and the passenger.

If it is determined that the passenger is not in the vehicle as a result of the camera image analysis (S10), the host system 20 may control the third display area DA3 to operate in the power saving mode (S11). Whether or not the passenger is in the vehicle may be sensed for each predetermined cycle.

When the passenger is in the vehicle as a result of the camera image analysis, the gaze of the passenger may be tracked in real time (S12). A cycle of tracking the gaze of the passenger may be faster than a cycle of determining whether or not the passenger is in the vehicle.

If it is determined that the passenger is watching the image in the third display area DA3 (S13), the third display area DA3 may operate in the normal mode (S15). However, if it is determined that the passenger does not gaze at the third display area DA3, the third display area DA3 may be operated in the power saving mode (S14).

Referring to FIGS. 1 and 5, when operating in the normal mode, the timing controller 30 may transmit the clock training signal CT and the control signal to the data driving circuit during the vertical blank period VB, and then transmit image data RGB to the data driving circuit 50. In the normal mode, the image data RGB of each pixel line may be transmitted, and the clock training signal CT and the control signal CP may be transmitted during the horizontal blank period HB.

The data driving circuit 50 may obtain configuration information by the control signal CP transmitted from the timing controller 30. The configuration information may include various control signals for driving the display.

A signal transmitted from the timing controller 30 to the data driving circuit 50 may be a signal having a clock embedded differential signal (CEDS) format. The clock training signal CT, the control signal CP, and the image data RGB included in the transmission signal may be transmitted alternately in a preset order.

The timing controller 30 may insert an operation control signal for controlling the operation state of the data driving circuit 50 into the control signal CP and transmit it to the data driving circuit 50.

When operating in the normal mode MODE1, the timing controller 30 may alternately transmit the clock training signal CT, the control signal CP, and the image data RGB in a preset order. However, if it is determined that the passenger is not watching the image, it may be operated in the power saving mode.

When operating in the power saving mode MODE2, the timing controller 30 may transmit a clock training signal CT, a control signal CP, and black data BD during the first period T1. Therefore, the data driving circuit 50 may output a black voltage to the display panel 10 during the first period T1.

The first period T1 may be a period for applying data of the first pixel line L1. However, embodiments of the present disclosure are not limited thereto. The first period T1 may be a period for applying data to a plurality of pixel lines. For example, the first period T1 may be a period for applying data to two pixel lines or a period for applying data to three or more pixel lines. However, it may be advantageous to transmit data only in a minimum period from the viewpoint of power consumption. The first period T1 may be shorter than one frame period.

The timing controller 30 may output black data to the first pixel line L1 of the display panel 10, and the data driving circuit 50 may output the black voltage to the first pixel line L1 of the display panel 10. In this case, the first pixel line L1 may be a first pixel line of the third display area DA3 operating in the power saving mode. Normal image data may be output to the first pixel line of the first display area DA1.

After outputting the black data to the first pixel line L1 of the third display area DA3, the timing controller 30 may transmit only the clock training signal CT and the control signal CP for the remaining period of one frame. In this case, a mode change signal for converting an operation mode may be additionally transmitted to the control signal CP.

The timing controller 30 may insert the mode change signal into a separate packet, e.g., C21, or insert the mode change signal into a dummy packet DMY and output the same. A method of inserting the mode change signal into a part of the data packet by the timing controller is not particularly limited.

For example, the operation of the data driving circuit 50 may be controlled by adding a mode change signal using 1-bit. For example, when the mode change signal is a 'low signal,' the data driving circuit 50 may be configured to output input data, and when the mode change signal is a 'high signal,' the data driving circuit 50 may be configured to output latched data. However, embodiments of the present specification are not limited thereto. Hereinafter, it will be described that a normal mode command is included in the control signal when the mode change signal is the low signal, and when the mode change signal is the high signal, it will be described that a power saving mode command is included in the control signal.

When a normal mode command is included in the first control signal CP1 of a period applied to the first pixel line L1, the data driving circuit 50 may convert the black data BD received after the first control signal CP1 into a black voltage and output the black voltage to the first pixel line L1 of the display panel.

When a power saving mode command is included in the second control signal CP2 applied to the second pixel line, the data driving circuit 50 may output latched black data BD without outputting data received after the first control signal CP1.

After transmitting the second control signal CP2, the timing controller 30 may repeatedly output only the clock training signal CT and the control signal CP. The timing controller 30 may repeatedly output only the clock training signal CT and the control signal CP until one frame period. In this case, each control signal may include a power saving mode command. Accordingly, the data driving circuit 50 may repeatedly output the latched black data from the third pixel line to the last pixel line Ln.

EPI data is typically transmitted as scrambled random data for EMI reduction. Since the black data is also EPI data, many toggling occur, which can be disadvantageous in terms of power consumption.

According to an embodiment, it may be advantageous to transmit a signal of a pattern with the least power consumption. For example, after transmitting the control signal CP, the clock training signal CT may be transmitted until the next control signal CP is received. The clock training signal CT may be advantageous in terms of power consumption because it has fewer data transitions. However, the embodiment of the present disclosure is not limited thereto. For example, various data patterns with fewer toggles may be transmitted in addition to the clock training signal CT.

The timing controller 30 may not transmit not only the image data but also the control signal CP and the clock training signal CT for a predetermined frame period T2 after the first frame. Accordingly, the timing controller 30 may not transmit any data and may not communicate until the predetermined frame after the first frame. The predetermined frame may be several frames, but is not necessarily limited thereto. For example, when the driving frequency is 60 Hz, the timing controller 30 may not communicate with the data driving circuit 50 during two to four frame periods. In this case, since the black data voltage is already charged in the storage capacitor (Cst of FIG. 8) of the pixel circuit, the black voltage may be maintained up to several frames. Accordingly, a black image may be output to the display panel even though the data driving circuit does not output the data voltage for several frames.

When the timing controller 30 is continuously operated in the power saving mode after several frames have elapsed, the timing controller 30 may transmit the black data to the data driving circuit 50 again during the first period T1. The timing controller 30 may not communicate with the data driving circuit 50 during several frame periods thereafter. Such operations may be repeated until the passenger gazes at the image and the mode is changed to the normal mode. When the mode is changed to the normal mode, the timing controller 30 may normally transmit the image data RGB for each frame.

Figure 7:
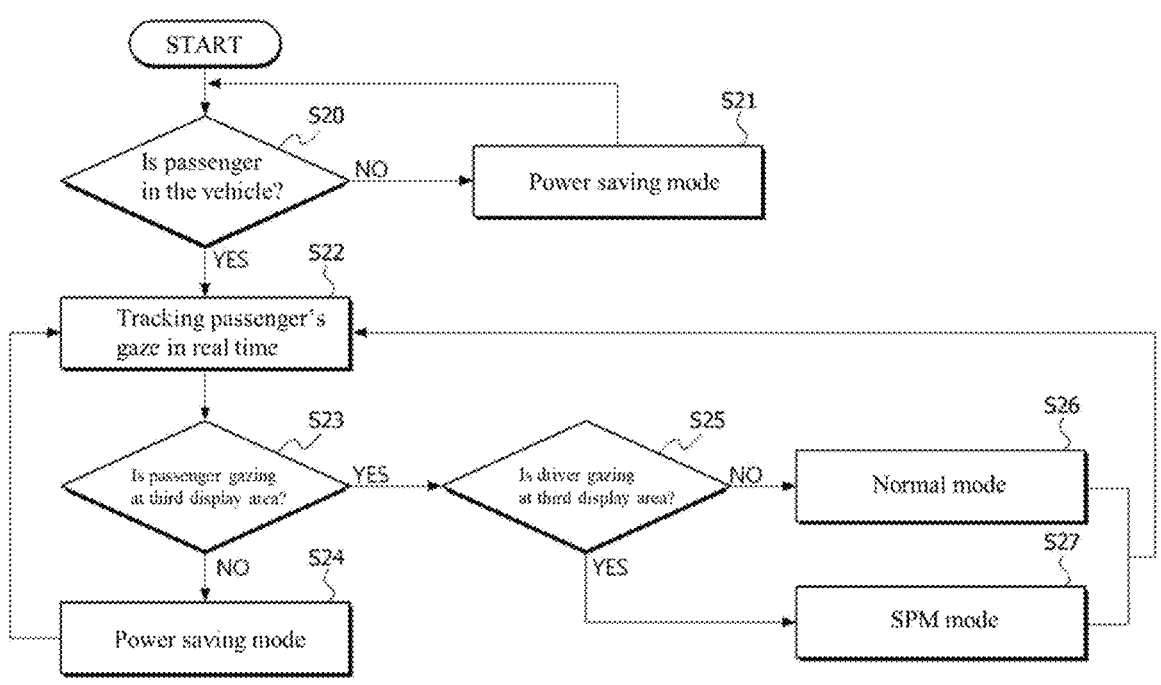
FIG. 7 is a flowchart illustrating a process of driving a third display area according to another embodiment of the present disclosure.

FIG. 7 is a flowchart illustrating a process of driving a third display area according to another embodiment of the present disclosure.

Referring to FIG. 7, when the ignition switch of the vehicle is turned on and the vehicle operates in a driving mode, the image analysis part of the host system 20 of the vehicle may output a control signal to photograph the user's face, analyze the image obtained by the camera, and track the gaze of the user and/or the passenger in real time. Various image detection algorithms may be applied to a technology for tracking the gaze of a user and/or a passenger using a camera image.

Accordingly, the host system 20 of the vehicle may detect which of the first to third display areas DA1, DA2, and DA3 the user is looking at.

As a result of the camera image analysis, if it is determined that the passenger is not in the vehicle (S20), the host system 20 may control the third display area DA3 to operate in the power saving mode (S21). Whether or not the passenger is in the vehicle may be sensed for each predetermined cycle.

When the passenger is in the vehicle as a result of the camera image analysis, the gaze of the passenger may be tracked in real time (S22). A cycle of tracking the gaze of the passenger may be faster than a cycle of determining whether or not the passenger is in the vehicle.

If it is determined that the passenger is watching the image in the third display area DA3 (S23), the third display area DA3 may operate in the normal mode (S26). However, if it is determined that the passenger does not gaze at the third display area DA3, the power saving mode may be operated (S24).

In this case, if it is determined that the passenger gazes at the third display area DA3 (S23), it may be additionally determined whether the driver gazes at the third display area DA3 (S25). If the driver gazes at the third display area DA3 while driving, it may interfere with driving. Accordingly, the host system 20 may operate the third display area DA3 in a viewing angle control mode (SPM mode) (S27).

Figure 8:
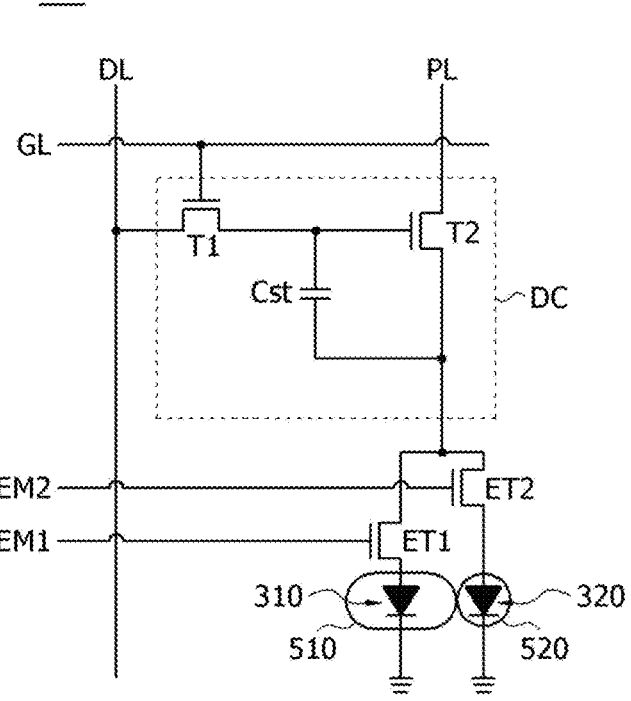
FIG. 8 is a circuit diagram schematically illustrating a pixel circuit of a display device according to one embodiment of the present disclosure.

FIG. 8 is a circuit diagram schematically illustrating a pixel circuit according to one embodiment of the present disclosure.

Referring to FIG. 8, the pixel circuit of the pixel PIX may include a plurality of transistors DT, T1, ET1, and ET2, a storage capacitor Cst, and a plurality of light-emitting elements 310 and 320.

The driving transistor DT and the storage capacitor Cst may be connected to the switching transistor T1. A first electrode of the driving transistor DT may be connected to a driving voltage supply line PL.

The switching transistor T1 may be connected to the gate line GL to receive a gate signal. The switching transistor T1 may be turned on or off by a gate signal. The first electrode of the switching transistor T1 may be connected to the data line DL. In response to the switching transistor T1 being turned on, a data signal may be supplied to the gate electrode of the driving transistor DT through the switching transistor T1.

The storage capacitor Cst may be disposed between the gate electrode and the second electrode of the driving transistor DT. The storage capacitor Cst may hold a signal applied to a gate electrode of the driving transistor DT, for example, a data signal during one or more frames.

According to an embodiment, the driving transistor DT, the switching transistor T1, and the storage capacitor Cst are components for driving the light emission of the first and second light-emitting elements 310 and 320 and may be defined as a driving part DC.

The first light-emitting element 310 may be connected to the first transistor ET1 which is turned on or off by the first emission signal EM1. The second light-emitting element 320 may be connected to the second transistor ET2 which is turned on or off by the second emission signal EM2. The driving part DC of the pixel circuit may further include first and second transistors ET1 and ET2.

The first light-emitting element 310 or the second light-emitting element 320 disposed in the second display area DA2 and the third display area DA3 may be connected to another configuration of the pixel circuit, for example, the driving transistor DT, depending on the mode.

The mode may be specified by an input of a user or determined when a predetermined condition is satisfied. For example, when a predetermined first condition is satisfied, the first emission signal EM1 is applied so that the first light-emitting element 310 may emit light.

When a predetermined second condition is satisfied, the second emission signal EM2 is applied so that the second light-emitting element 320 may emit light. The first condition may include a condition predetermined for driving in the first mode. For example, the first condition may be a case in which the user does not gaze at the third display area. The second condition may include a condition predetermined for driving in the second mode. For example, the second condition may be a case in which the user gazes at the third display area.

A first lens 510 may be disposed on the first light-emitting element 310, and a second lens 520 may be disposed on the second light-emitting element 320. The first lens 510 may be a wide viewing angle lens, and the second lens 520 may be a narrow viewing angle lens.

When the first light-emitting element 310 is turned on, the light passing through the first lens 510 has a wide viewing angle, and thus both the user and the passenger may watch the image in the third display area DA3. When the second light-emitting element 320 is turned on, since the output light has a narrow viewing angle, the passenger may view the image, but the user may not view the image.

Referring back to FIG. 7, when operating in the normal mode or the SPM mode depending on whether the driver gazes at the third display area, it is possible to determine whether the passenger is staring at the third display area by tracking the passenger's gaze again after a certain period of time.

According to an embodiment, power consumption may be minimized by operating in a power saving mode depending on whether a passenger watches an image, and at the same time, a viewing angle may be adjusted by monitoring whether a user watches an image while driving. Thus, it is advantageous to reduce power consumption, while enabling safe driving.

Figure 9:
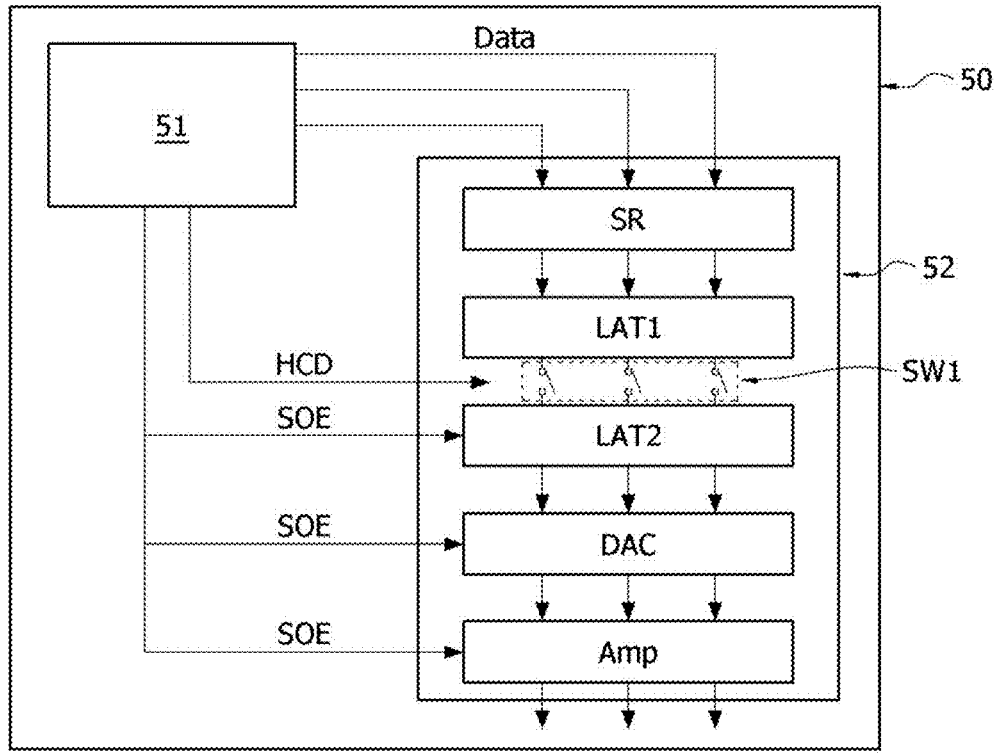
FIG. 9 is a block diagram illustrating a data driving circuit according to a first embodiment of the present disclosure.
Figure 10:
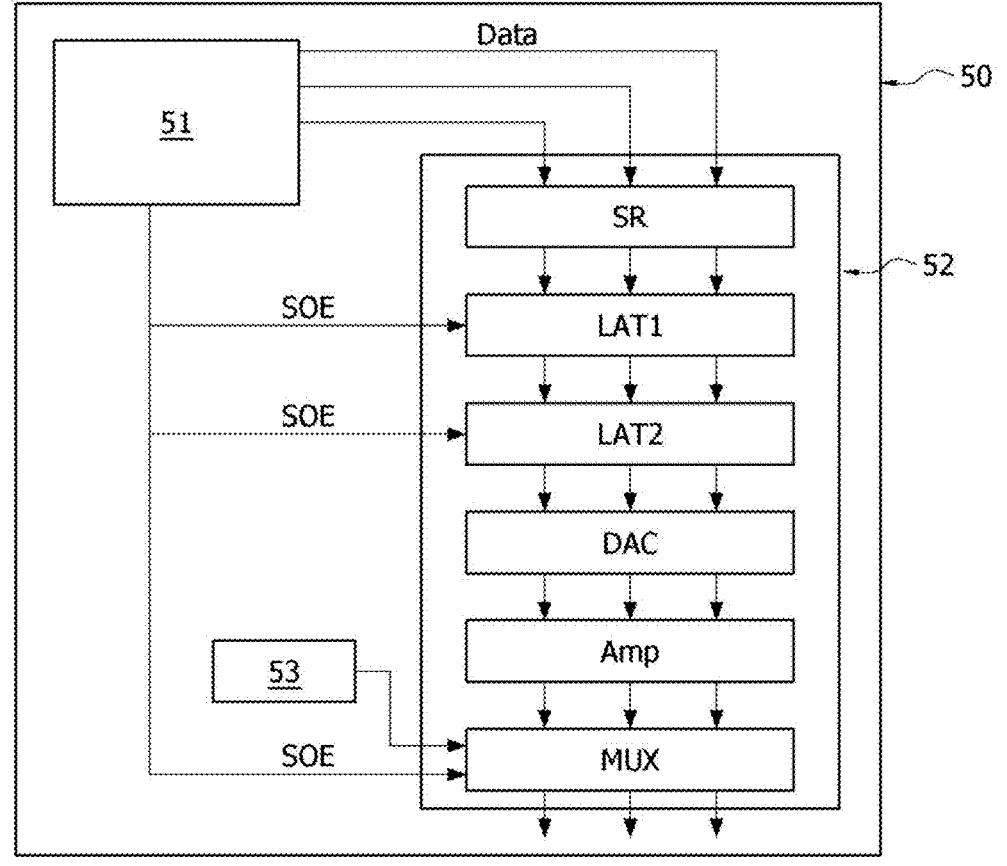
FIG. 10 is a block diagram illustrating a data driving circuit according to a second embodiment of the present disclosure.
Figure 11:
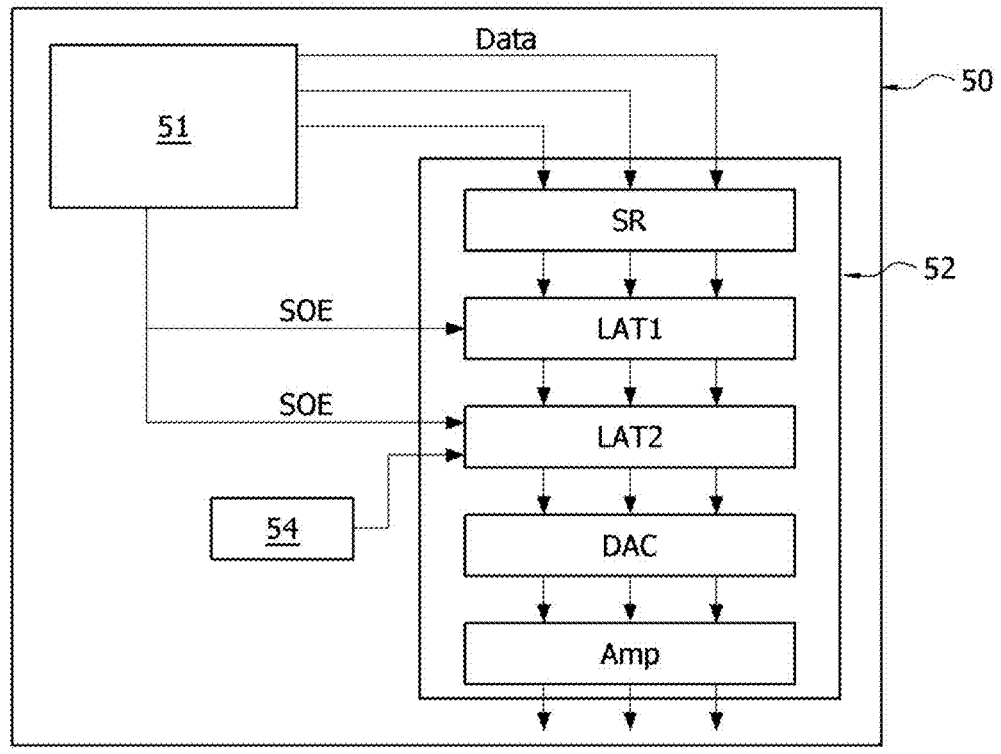
FIG. 11 is a block diagram illustrating a data driving circuit according to a third embodiment of the present disclosure.
Figure 12:
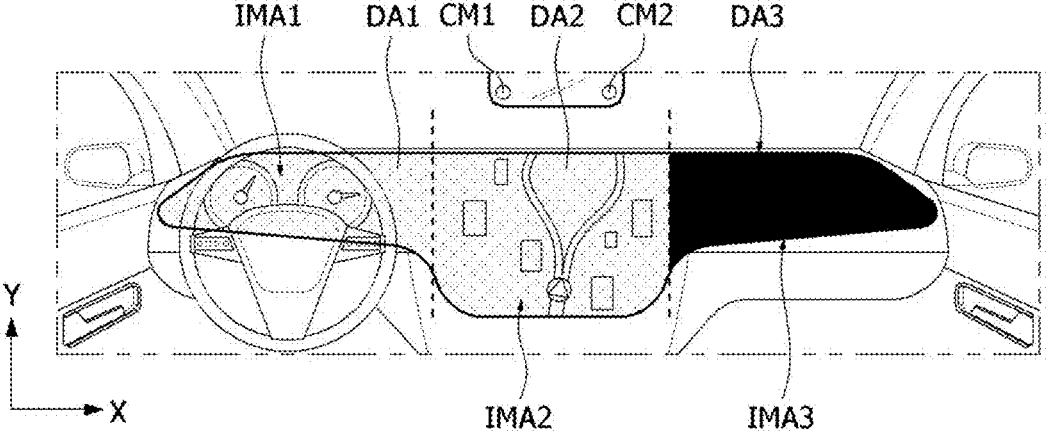
FIG. 12 is a diagram illustrating a state in which a black image is output on a third display area according to one embodiment of the present disclosure.

FIG. 9 is a block diagram illustrating a data driving circuit according to a first embodiment of the present disclosure. FIG. 10 is a block diagram illustrating a data driving circuit according to a second embodiment of the present disclosure. FIG. 11 is a block diagram illustrating a data driving circuit according to a third embodiment of the present disclosure. FIG. 12 is a diagram illustrating a state in which a black image is output in a third display area according to one embodiment of the present disclosure.

Referring to FIG. 9, the data driving circuit 50 according to an embodiment may include a data logic part 51 and a data conversion part 52.

A recovery circuitry (not shown) may be disposed at a front end of the data logic part 51. The recovery circuitry may serve to recover a clock signal, a data signal, and the like within a data packet input through an input terminal. The recovery circuitry may transmit the recovered signal to the data logic part 51.

The data logic part 51 may serve to receive a clock signal and a data signal from the recovery circuitry, convert a data signal input in a serial form into a parallel form, and output the same. Furthermore, the data logic part 51 serves to generate a source output signal SOE and a switch control signal HCD for controlling a device included in the data driving circuit 50 and for controlling an output timing of the data conversion part 52.

The data conversion part 52 may serve to convert a digital data signal transferred from the data logic part 51 into an analog data voltage and output the converted analog data signal. The data conversion part 52 may output a data voltage through an output terminal in response to a source output signal SOE output from the data logic part 51. The data conversion part 52 may include a shift register SR, latches LAT1 and LAT2, a digital-to-analog converter DAC, and an output buffer AMP.

The shift register SR, latch, and digital-to-analog converter DAC may perform operations to sample and store parallel data signals and then convert digital data signals to analog data voltages.

The first latch LAT1 may sequentially store data input from the data logic part 51 in response to a sampling signal supplied from the shift register SR, and then output the stored data. The second latch LAT2 may be connected to the first latch LAT1 to store the data stored in the first latch LAT1.

According to an embodiment, the switch part SW1 may be disposed between the first latch LAT1 and the second latch LAT2. When the switch control signal HOD is not output from the data logic part 51, the switch part SW1 may be turned off to block the electrical connection between the first latch LAT1 and the second latch LAT2. When the switch part SW1 is turned off, the second latch LAT2 may store the previously stored data as it is without updating the data.

When operating in the power saving mode, the data logic part 51 may transmit the received black data to the first latch LAT1. When the switch part SW1 is turned on by the switch control signal HOD, the second latch LAT2 may store the black data stored in the first latch LAT1. Thereafter, the second latch LAT2 may transmit the stored data to the digital-to-analog converter DAC in response to the source output signal SOE.

The digital-to-analog converter DAC may convert a black data signal into an analog black voltage and output it to the first pixel line L1 of the display panel.

As described in FIGS. 5 and 6, the data of the second pixel line may be received with only the clock training signal CT and control signal CP while omitting the image data RGB. In this case, when a power saving mode command is included in the control signal CP, the data logic part 51 may not output the received data to the shifter register SR and/or the first latch LAT1 and may not output the switch output signal HOD to the switch part SW1.

Thus, since the switch part SW1 is turned off and thus the second latch LAT2 is blocked from the first latch LAT1, the previously stored black data may be stored as it is. Thereafter, when the source output signal SOE is applied to the second latch LAT2, the second latch LAT2 may transmit the stored black data to the digital-to-analog converter DAC as it is.

Therefore, the black voltage may be output to the next pixel line without additionally receiving black data from the timing controller 30. This process may be repeated until the black voltage is output to all of the pixel lines of the first frame. Therefore, since the black data voltage is not continuously received from the timing controller 30, power consumption may be reduced.

When the first frame period elapses, the timing controller 30 may not transmit EPI data for several frame periods. Accordingly, the data driving circuit 50 may not perform any operation for several frame periods. The data logic part 51 may not apply the source output signal SOE to the second latch LAT2 during several frames.

However, since the black voltage is charged to the storage capacitor of each pixel during the first frame period, the third display area DA3 may maintain the black image even if the data drive circuit 50 does not output a data voltage for several frame periods.

Then, when a predetermined frame period elapses, the black data voltage may be applied to the first pixel line of a next frame in the same way and then the black voltage may be repeatedly output. For example, the data logic part 51 may apply the source output signal SOE to cause the second latch LAT2 to output a black voltage to the first pixel line in the next frame period after the predetermined frame period. This process may be repeatedly performed until the normal mode is operated.

According to an embodiment, the data logic part 51 may apply the source output signal SOE to the digital-to-analog converter DAC together when the source output signal SOE is applied to the second latch LAT2. For example, the source output signal SOE may be applied to a switch (not shown) that operates the digital to analog converter DAC to selectively operate it.

In addition, the data logic part 51 may also apply the source output signal SOE to the driving voltage switch of the output buffer AMP when it applies the source output signal SOE to the second latch LAT2. According to an embodiment, when the data voltage is output, the source output signal SOE may be applied simultaneously or sequentially to the second latch LAT2, the digital-to-analog converter DAC, and the output buffer AMP. Accordingly, unnecessary standby power may be reduced by applying power to the second latch LAT2, the digital-to-analog converter DAC, and the output buffer AMP only when the data voltage is output.

Referring to FIG. 10, the data driving circuit 50 according to an embodiment may include a data logic part 51 and a data conversion part 52.

The data logic part 51 may serve to receive a clock signal and a data signal from the recovery circuit, convert a data signal input in a serial form into a parallel form, and output the converted data signal. Furthermore, the data logic part 51 may serve to control a device included in the data driving circuit 50, and generate a source output signal SOE for controlling an output timing of the data conversion part 52.

The data conversion part 52 may serve to convert a digital data signal transferred from the data logic part 51 into an analog data voltage and output the converted analog data signal. The data conversion part 52 may output a data voltage through an output terminal in response to a source output signal SOE output from the data logic part 51. The data conversion part 52 may include a shift register SR, latches LAT1 and LAT2, a digital-to-analog converter DAC, and an output buffer AMP.

The shift register SR, the latch, and the digital-to-analog converter DAC may perform operations to sample and store data signals in parallel systems and then convert digital data signals into analog data voltages.

The black voltage may be applied to the data driving circuit 50 through a separate line 53. The data logic part 51 may not receive black data from the timing controller 30 from when it operates in the sleep mode.

When receiving a power saving mode operation signal from a control signal CP, the data logic part 51 may directly apply a black voltage to the MUX. According to such a configuration, power consumption may be minimized because black data is not received from the power saving mode start step. The data logic part 51 may repeatedly output a black voltage to the MUX until a normal mode operation signal is received from the timing controller 30.

The black voltage may be applied from the power supply part 70, but is not necessarily limited thereto. For example, a separate voltage circuit may be provided.

Referring to FIG. 11, the data driving circuit 50 according to an embodiment may include a data logic part 51 and a data conversion part 52. The shift register SR, the latch, and the digital-to-analog converter DAC of the data conversion part may perform operations of sampling and storing the parallel data signal and then converting the digital data signal into an analog data voltage.

The data driving circuit 50 may directly input black data to the second latch LAT2 in the power saving mode. The data driving circuit 50 may pre-store black data in the register 54 or a separate memory. Accordingly, the data driving circuit 50 may directly input black data to the first latch LAT1 or the second latch LAT2 without receiving black data from the timing controller 30 in the power saving mode.

The second latch LAT2 may then transmit the stored data to the digital-to-analog converter DAC in response to the source output signal SOE. The digital-to-analog converter DAC may convert the black data signal into a black voltage in an analog form and output it to the first pixel line L1 of the display panel.

Referring to FIG. 12, in the above-described configuration, when a passenger does not view an image in the third display area DA3, the third display area DA3 may output the black image IMA3 to minimize power consumption. If it is determined that the passenger watches the image again, the image may be normally output. Since the black image is output only in some frames, the user or the passenger may not recognize the black image and thus may not feel inconvenience in viewing the image.

Figure 13:
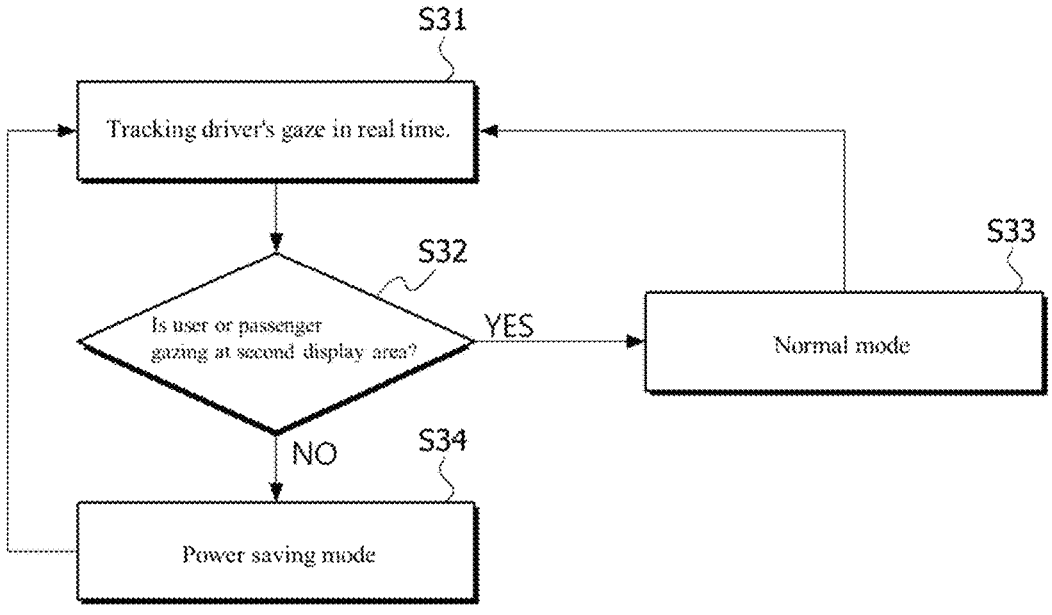
FIG. 13 is a flowchart illustrating a process of driving a second display area according to one embodiment of the present disclosure.
Figure 14:
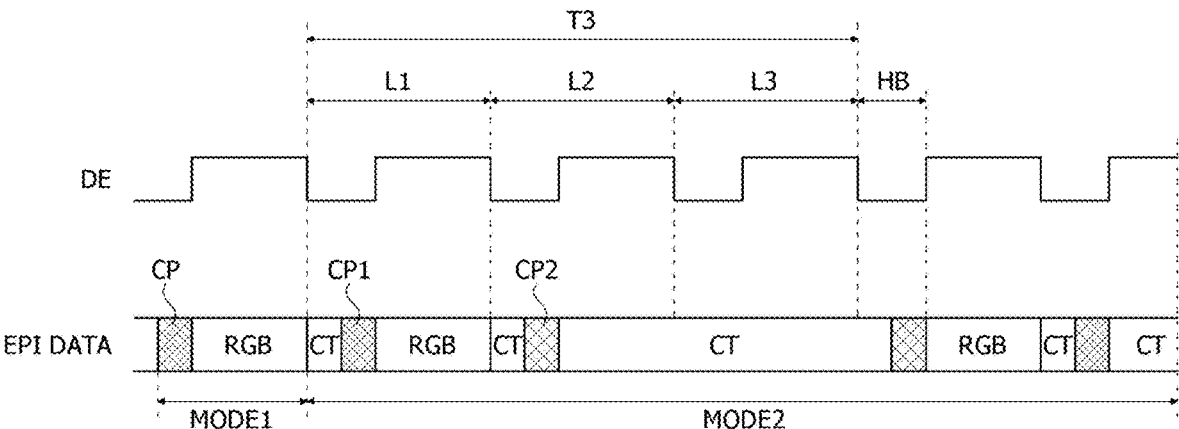
FIG. 14 is a diagram illustrating a data sequence according to one embodiment of the present disclosure.
Figure 15:
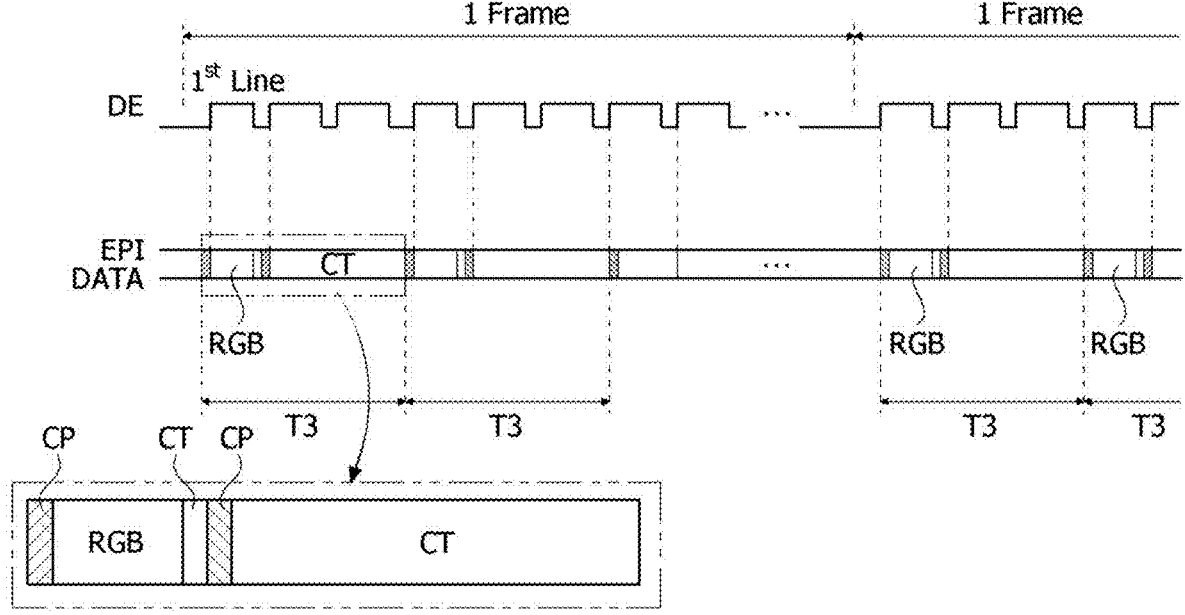
FIG. 15 is a diagram illustrating a data structure in which some data is omitted in a power saving mode according to one embodiment of the present disclosure.

FIG. 13 is a flowchart illustrating a process of driving a second display area according to one embodiment of the present disclosure. FIG. 14 is a diagram illustrating a data structure of a power saving mode according to one embodiment of the present disclosure. FIG. 15 is a diagram illustrating a structure in which image data is skipped in some frames in a power saving mode according to one embodiment of the present disclosure.

Referring to FIG. 13, when the ignition switch of the vehicle is turned on, the camera module may photograph the user's face under the control of the host system of the vehicle to track the gaze (S31). Various image detection algorithms may be applied to a technology for tracking the gaze of a user or a passenger using camera images.

The camera may simultaneously detect the gaze of the user and the gaze of the passenger, and a plurality of cameras may detect the gaze of the user and the gaze of the passenger, respectively. It may be determined whether the user or the passenger is staring at the second display area DA2 by analyzing the camera image (S32).

The second display area DA2 may output information that is not necessarily information for driving displayed in the first display area DA1, but is helpful for driving. For example, navigation images may be output in the second display area DA2. Depending on the user or the purpose of the driving, navigation images may or may not be necessary. Therefore, when the user or the passenger does not gaze at the navigation images, the power saving mode is operated.

By tracking the user's gaze in real time, the normal mode may be operated when the user and/or passenger gazes at the second display area DA2 (S33). However, when the user and/or the passenger do not gaze at the second display area DA2, the power saving mode may be operated (S34).

Referring to FIGS. 14 and 15, when the normal mode MODEL is changed to the power saving mode MODE2, the timing controller 30 may transmit EPI data once to an (N)th pixel line of the second display area DA2. In addition, only the control signal CP and the training signal CT may be transmitted to an (N+1)th pixel line. In addition, only the training signal CT may be transmitted to an (N+2)th pixel line.

For example, during a period in which the timing controller 30 transmits data to a first pixel line L1, the image data RGB may be transmitted together with the first control signal CP1. A normal mode command may be inserted into the first control signal CP1. Accordingly, the data driving circuit 50 may convert the received data into a voltage and output the same to the display panel. Accordingly, the first pixel line may output a normal image.

During a period of transmitting data to a second pixel line L2, the timing controller 30 may transmit only the second control signal CP2 and the training signal CT without transmitting image data. In this case, a power saving mode command may be inserted into the control signal CP2. Accordingly, the data driving circuit 50 may output the data voltage output to the first pixel line L1 to the second pixel line L2 as it is.

Thereafter, the timing controller 30 may transmit only the training signal CT during a period of transmitting data to the third pixel line L3. However, since the data driving circuit 50 has not received the separate control signal, the data driving circuit 50 may output the data voltage output to the first pixel line as it is to the third pixel line without updating the data.

According to an embodiment, the data driving circuit 50 may output the data voltage of the first pixel line to the second pixel line and the third pixel line.

Thereafter, the timing controller 30 may transmit normal data again in the fourth pixel line. In this case, the control signal may contain a normal mode command. Therefore, the normal image may be output in the fourth pixel line. Thereafter, the data voltages of the fourth pixel line may be output in the fifth pixel line and the sixth pixel line. That is, the transmission of data to the three pixel lines may be repeated as the third cycle T3.

According to the embodiment, since the same image is outputted for each of the three pixel lines, the amount of information on the image is reduced, but there is an advantage of being able to immediately provide minimum information when the driver and/or passenger gazes at the second display area again. Thereafter, it is possible to update as much information as possible by shifting the repeated pixel lines.

While the embodiments of the present disclosure have been described in greater detail with reference to the accompanying drawings, the present disclosure is not necessarily limited to such embodiments and may be variously modified within the scope thereof without departing from the technical spirit of the present disclosure. Therefore, the embodiments disclosed in the present disclosure are provided for illustrative purposes only and are not intended to limit the technical concept of the present disclosure, and the scope of the technical concept of the present disclosure is not limited thereto. Therefore, it should be understood that the embodiments described above are illustrative in all aspects and do not limit the present disclosure. The scope of the present disclosure should be construed to include those of the following claims, and all technical concepts within the equivalent scope thereof should be construed as falling within the scope of the present disclosure.

DESCRIPTION OF REFERENCE NUMERALS

10: Display panel
20: Host system
30: Timing controller
50: Data driving circuit
DA: Display area The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:
   a display panel configured to display images;
   a data driving circuit configured to apply a data voltage to the display panel; and
   a timing controller configured to control the data driving circuit,
   wherein the timing controller is configured to transmit black data to the data driving circuit during a first period in a power saving mode, and
   the data driving circuit is configured to store the black data and to repeatedly outputs a black voltage according to the stored black data during a first frame period.

2. The display device of claim 1, wherein the first period is a data transmission period of a first pixel line of a first frame corresponding to the first frame period.

3. The display device of claim 1, wherein the timing controller is configured to not transmit image data after the first period during the first frame period.

4. The display device of claim 3, wherein the timing controller is configured to transmit a control signal and a clock training signal for each pixel line cycle during the first frame period.

5. The display device of claim 4, wherein:
   the control signal contains a power saving mode command, and
   the data driving circuit is configured to output the black voltage again according to the stored black data in response to receiving the power saving mode command.

6. The display device of claim 4, wherein the timing controller is configured to not transmit a clock training signal, a control signal, or image data for a set frame period after the first frame period.

7. The display device of claim 6, wherein the display panel is configured to output a black image by the black voltage stored in a capacitor during a preset frame period.

8. The display device of claim 6, wherein the timing controller is configured to output black data to the first pixel line in a next frame period after the set frame period.

9. The display device of claim 1, wherein the timing controller transmits image data in a same manner as a normal mode when changing from the power saving mode to the normal mode.

10. The display device of claim 1, wherein:

the display panel includes a first display area and a second display area in which an image related to the driving of a vehicle is displayed, and a third display area in which an image not related to the driving of the vehicle is displayed, and the data driving circuit controlling the third display area is configured to store the black data when operating in the power saving mode and to repeatedly output the black voltage according to the stored black data during the first frame period.

11. The display device of claim 10, wherein the data driving circuit controlling the first display area is configured to operate in the normal mode when the data driving circuit controlling the third display area operates in the power saving mode.

12. A data driving circuit comprising:

a data logic part;

a first latch configured to store data supplied from the data logic part;

a second latch configured to store data stored in the first latch;

a switch part disposed between the first latch and the second latch; and a digital-to-analog converter configured to convert a digital signal output from the second latch into an analog voltage, wherein:

a black data input is configured to be stored in the first latch and the second latch during a first period, and the data logic part is configured to apply a source output signal to the second latch while the switch part is turned off after the first period and to repeatedly output a black voltage during a first frame period.

13. The data driving circuit of claim 12, wherein the first period is a data transmission period of a first pixel line of a first frame corresponding to the first frame period.

14. The data driving circuit of claim 12, wherein the data logic part is configured to not apply the source output signal to the second latch for a set frame period after the first frame period.

15. The data driving circuit of claim 14, wherein the data logic part is configured to output the source output signal to the second latch to cause the black voltage to be output to the first pixel line in a next frame period after the set frame period.

16. The data driving circuit of claim 12, wherein the data logic part is configured to apply the source output signal to the digital-to-analog converter when the source output signal is applied to the second latch.

17. The data driving circuit of claim 16, further comprising:

an output buffer connected to the digital-to-analog converter, wherein the data logic part is configured to apply the source output signal to the output buffer when the source output signal is applied to the second latch.

18. A device comprising:

a display device configured to display an image;

an image acquisition device configured to track a gaze of a user staring at the display device; and a host system configured to control the display device and the image acquisition device, wherein the host system is configured to control the display device to operate in a power saving mode in response to it is determined that the user is not watching the image, wherein the display device includes:

a display panel configured to display the image;

a data driving circuit configured to apply a data voltage to the display panel; and a timing controller configured to control the data driving circuit, wherein the timing controller is configured to transmit black data to the data driving circuit during a first period in the power saving mode, and wherein the data driving circuit is configured to store the black data and to repeatedly output a black voltage according to the stored black data during a first frame period.

19. The device of claim 18, wherein the first period is a data transmission period of a first pixel line of a first frame corresponding to the first frame period.

20. The device of claim 18, wherein the timing controller is configured to not transmit image data after the first period during the first frame period.

21. The device of claim 20, wherein the timing controller is configured to transmit a control signal and a clock training signal for each pixel line cycle during the first frame period.

22. The device of claim 21, wherein:

the control signal contains a power saving mode command, and the data driving circuit is configured to output a black voltage according to the stored black data when receiving the power saving mode command.

23. The device of claim 18, wherein:

the display panel includes a first display area, a second display area, and a third display area that output different images, an image related to the driving of the vehicle is displayed on the first display area and the second display area display, an image not related to the driving of the vehicle is displayed on the third display area displays, and the host system is configured to operate the third display area in the power saving mode in response to it is determined that a passenger among the users does not view the third display area.

24. The device of claim 23, wherein the host system is configured to operate the third display area in a viewing angle restriction mode in response to it is determined that both the passenger and a driver among the users watch the third display area.

* * * * *